F. A. HOPKINS.
CALCULATING MACHINE.
APPLICATION FILED JAN. 23, 1911.
1,038,890.
Patented Sept. 17, 1912.
3 SHEETS—SHEET 2.
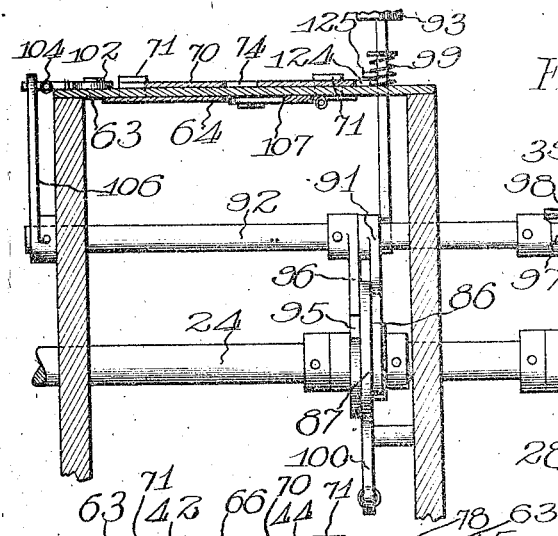
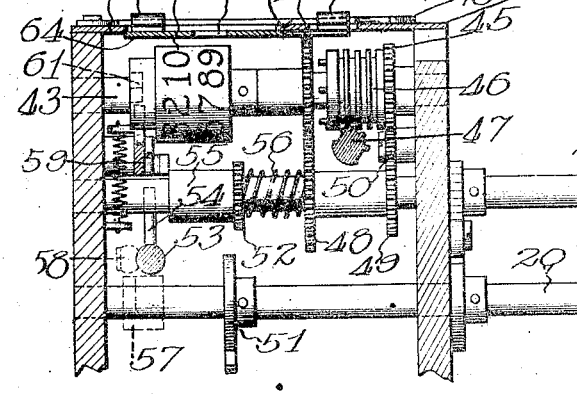
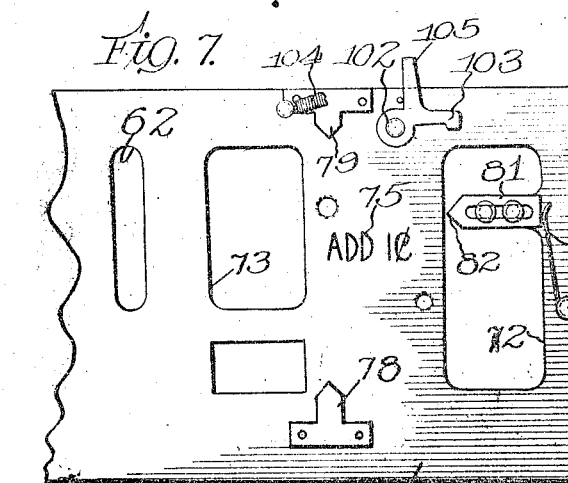
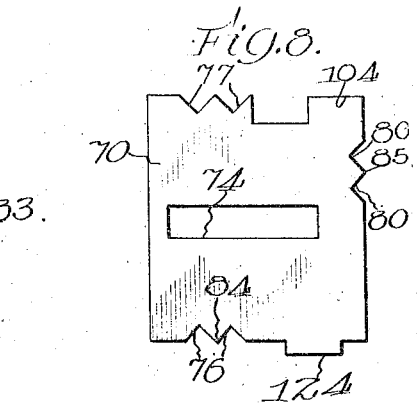
Witnesses:
Inventor:
Francis A. Hopkins
By: Bennett Hopkins
Att'ys:

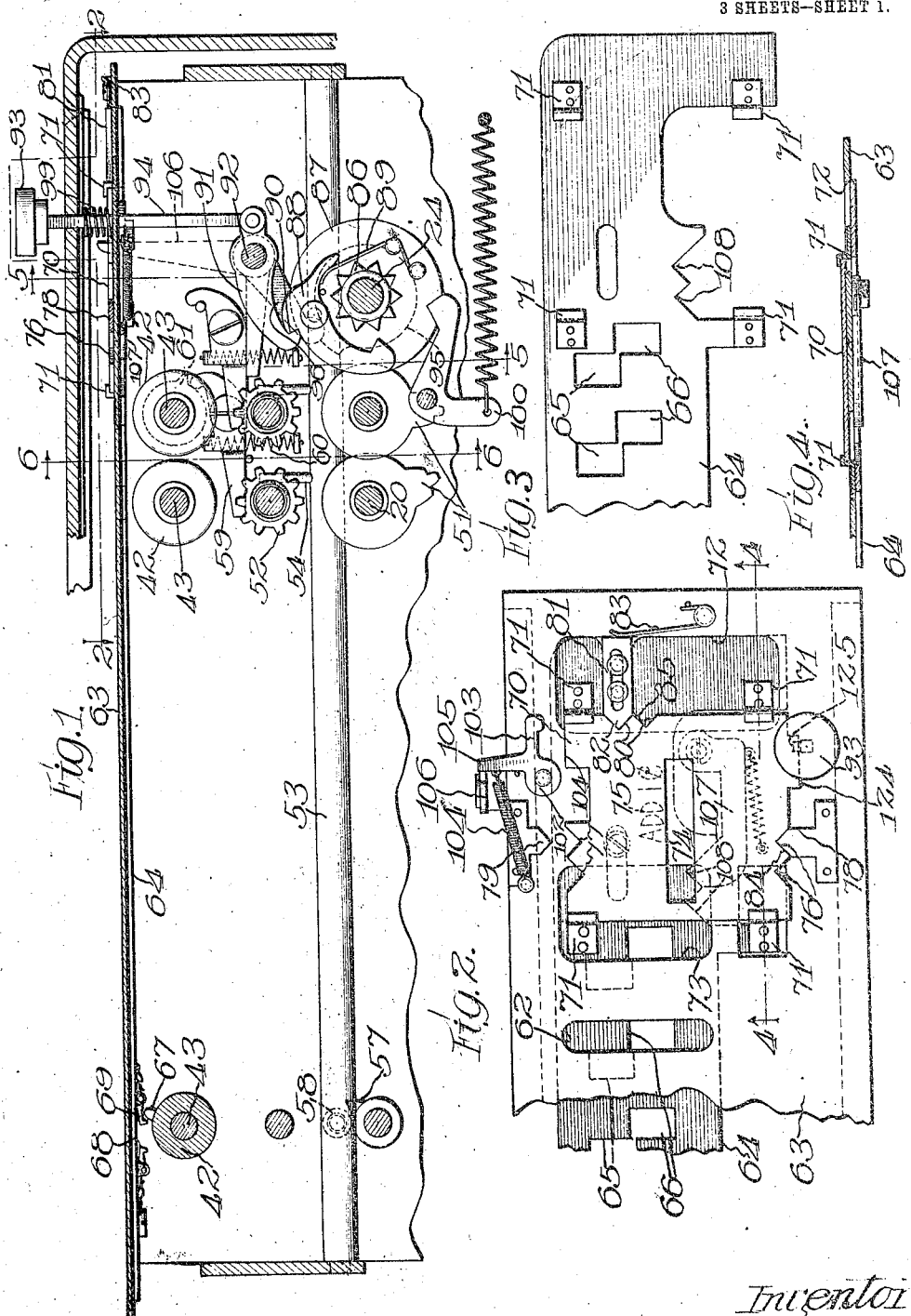

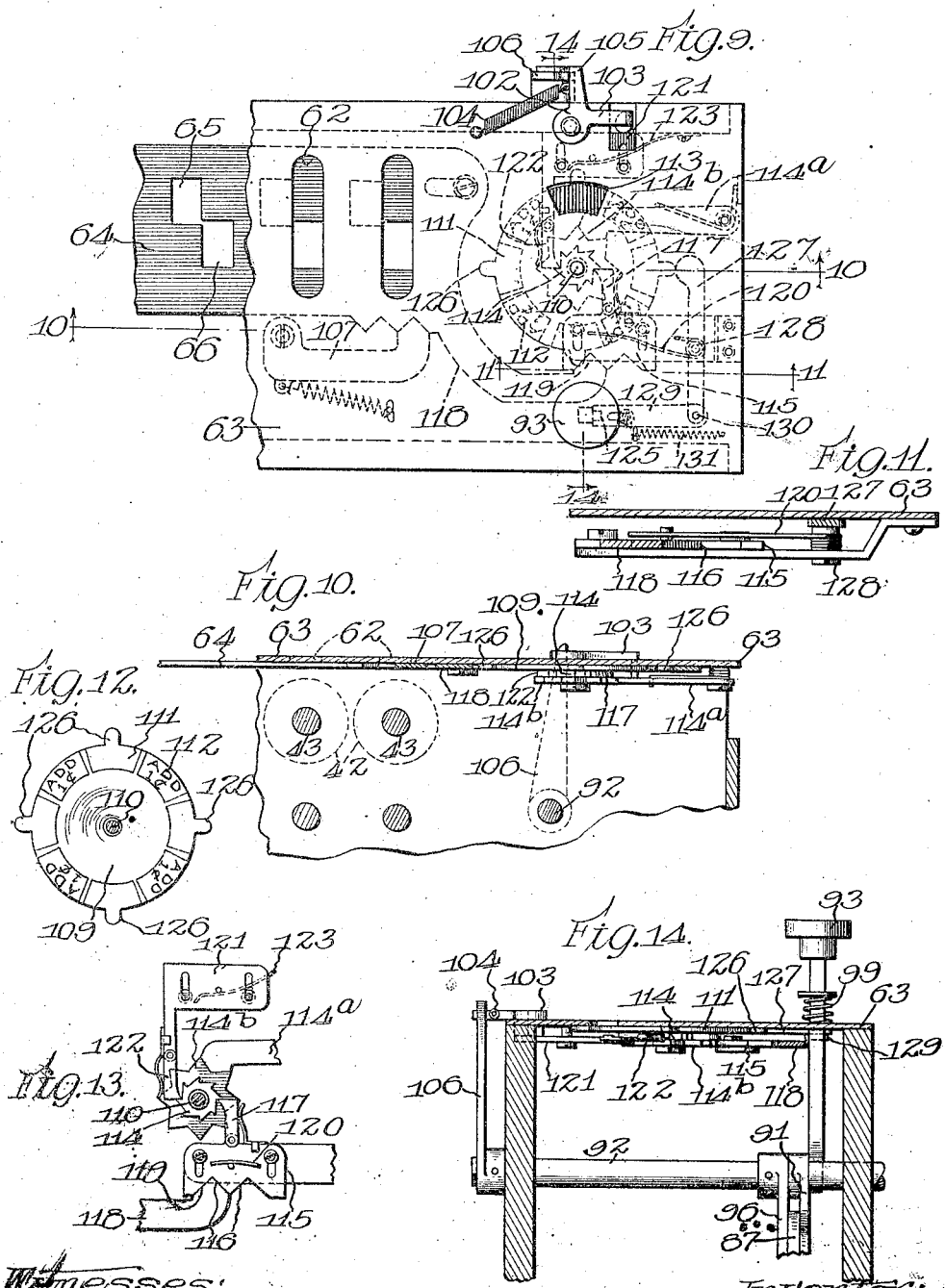

UNITED STATES PATENT OFFICE.

FRANCIS A. HOPKINS, OF CHICAGO, ILLINOIS, ASSIGNOR TO CARLIN CALCULATOR COMPANY, OF CHICAGO, ILLINOIS, A CORPORATION OF ILLINOIS.

CALCULATING-MACHINE.

1,038,890.  Specification of Letters Patent.  Patented Sept. 17, 1912.

Application filed January 23, 1911. Serial No. 604,027.

*To all whom it may concern:*

Be it known that I, FRANCIS A. HOPKINS, a citizen of the United States, residing at Chicago, in the county of Cook and State of Illinois, have invented certain new and useful Improvements in Calculating-Machines, of which the following is a specification.

This invention relates to improvements in algebraic calculating machines—*i. e.*, those embodying means adapted to register negative and positive amounts, or debits and credits indiscriminately and show the correct resultant, and indicate whether the resultant is negative or positive.

A type of algebraic calculating machines is shown and described in the application of Samuel E. Carlin, Serial No. 580,569, filed in the United States Patent Office on or about September 6, 1910, in connection with which machine the present invention will be described, and such parts of said machine are herein shown and described as will enable an understanding to be had of my present invention.

In algebraic calculating machines the passage of the operation through zero results in a deficit of one unit in the resultant. In order, therefore, to indicate the correct result on the register, it is necessary to add one unit thereto either manually or automatically. In the Carlin machine above referred to, it is added automatically each time zero is passed in the operation of the mechanism. It is a fact, however, that such an algebraic calculating machine even without this automatic means would always rectify the deficit caused by the passing of the mechanism through zero in one direction when the operation of the mechanism through zero again takes place in the opposite direction so that in extended calculations involving the passing of the mechanism through zero back and forth numerous times, the deficit need be added only at the conclusion of the calculation if it be due, but the difficulty in thus deferring the correction of the resultant lies in keeping track of the number of operations; or in other words whether the last operation was in a direction to create the deficit or to correct it.

The primary object of this invention, therefore, is the provision of means, in an algebraic calculating machine, for signifying when the said deficit exists so that the operator may know when to correct the resultant.

A further object is the provision of means for showing automatically that the deficit has been supplied or the resultant rectified so that the operator may not through confusion or forgetfulness add the amount of the deficit when the resultant is correct.

A further object of the invention is the provision of means for adding the deficit combined with means for automatically locking the first said means against operation save when the deficit exists.

A further object is to provide an improved machine of this character having manually controlled means for supplying an additional digit, and means whereby the manually controlled means may be locked against actuation after the additional digit or amount has been supplied, and means for automatically releasing the manually controlled means whenever it is necessary to add this additional digit.

A further object is to provide an improved machine of this character which will be simple, durable, and cheap in construction, and effective, efficient and positive in its action.

To the attainment of these ends and the accomplishment of other new and useful objects, as will appear, the invention consists in the features of novelty in the construction, operation and arrangements of the parts hereinafter more fully described and claimed and shown in the accompanying drawings illustrating the embodiment of the invention, and in which—

Figure 1 is a vertical transverse sectional view of a portion of a calculating machine having the mechanism applied thereto constructed in accordance with the principles of this invention. Fig. 2 is a detail top plan view taken on line 2—2, Fig. 1, looking in the direction of the arrows. Fig. 3 is a detail plan view of the shifting shield or indicator for indicating the series on the number bearing members which are to be read. Fig. 4 is a detail sectional view on line 4—4, Fig. 2. Fig. 5 is a detail sectional view on line 5—5, Fig. 1. Fig. 6 is a sectional view on line 6—6, Fig. 1. Fig. 7 is a top plan view of a portion of the frame or casing through which the characters on the number bearing members may be read. Fig. 8 is a detail plan view of the supplemental shield or shutter for indicating and concealing the notice to the operator that a digit must be added after the calculation has been completed. Fig. 9 is a view similar to Fig. 2 of another form of the invention. Fig. 10 is a sectional view on line 10—10, Fig. 9. Fig. 11 is a sectional view on line 11—11, Fig. 9. Fig 12 is a detail plan view of the supplemental indicator shown in Fig. 9. Fig. 13 is a detail plan view of the parts or mechanism for imparting motion to the indicator shown in Figs. 9 and 12. Fig. 14 is a sectional view on line 14—14, Fig. 9.

Referring more particularly to the drawings, the machine to which this invention is particularly adapted, though not necessarily limited in its use thereto, embodies a plurality of what might be termed power shafts 20 (see Figs. 5 and 6), any number of which may be provided, preferably one for each of the number bearing members of the totalizers to be hereinafter referred to. Mounted upon and secured to each of these shafts 20 for rotation therewith are mutilated gears 21 which latter impart a variable movement to operating shafts 22, the latter being located in close proximity to the shafts 20, preferably directly above the respective shafts. A traveling gear 23 is mounted upon each of the shafts 22 for rotation therewith and these gears 23 are adapted to be positioned with respect to the mutilated gears 21 by the operation of the keys which control the selecting mechanisms shown and described in the application above referred to. There is also provided a running shaft 24, which latter receives its motion from any suitable source of power and secured to and for rotation with this shaft 24 is a star or toothed member 25. A disk 26 is mounted loosely upon the shaft 24 and carried by this disk is a pawl 27, which is adapted to coöperate with the star or toothed wheel 25 to lock the disk 26 to the shaft 24 for rotation therewith when the space bar of the machine is operated in the manner which will be briefly described. A gear 28 is also mounted loosely upon the shaft 24 and is secured to the disk 26 for rotation therewith. This gear 28 meshes with a companion gear on a shaft 29 which latter is arranged adjacent and parallel to the shaft 24 so that when the disk 26 is locked to the shaft 24 the gear 28 will be rotated by this running shaft and the motion of this gear will be imparted to the shaft 29 through the medium of the gear (not shown) with which the gear 28 meshes. This shaft 29 is provided for the purpose of communicating the motion of the running shaft 24 to the power shafts 20 and is accomplished by means of a bevel gear 30 secured to the shaft 29 for rotation therewith and this bevel gear 30 meshes with a companion gear 31 secured to a shaft 32 and which shaft is arranged adjacent and transversely with respect to the ends of the power shafts 20. Each of these shafts 20 is provided with a bevel gear 33 which meshes with a companion gear 34 on the shaft 32.

A space bar is provided which is adapted to be actuated after the mechanisms have been set by the actuating keys of the machine, for imparting motion to the various power shafts 20. This space bar is provided with a stem 35 (see particularly Fig. 5) which is connected to a rock shaft 36 and this rock shaft is journaled in suitable supports 37, 38. The extremity of the rock shaft terminates adjacent the disk 26 and a dog or pawl 39 is mounted loosely upon the extremity of the rock shaft. One extremity of this dog or pawl coöperates with the dog 27 and is adapted to engage a shoulder on the dog for lifting the latter out of engagement with the star or toothed wheel 25, against the tension of an elastic member which is provided and which tends normally to move the dog 27 into engagement with the star or toothed wheel. Secured to the other end of the dog or pawl 39 is a laterally projecting pin or lug 40 which projects into the path of movement of a laterally projecting pin or lug 41 on the shaft 36. When the dog or pawl 49 is in an operating position to hold the dog 27 out of engagement with the star or toothed wheel 25, the pin 40 will assume a position that when the shaft 36 is rocked by the stem 35 of the space bar, the pin 41 will engage the pin 40 to rock the dog or pawl 39 in such a manner as to release the dog or pawl 27 to permit the latter to engage the star or toothed wheel 25 to lock the disk 26 and gear 28 for rotation with the running shaft 24.

The number bearing members 42 (reference being now had more particularly to Fig. 6) are secured to shafts 43 for rotation therewith. These shafts 43 are mounted in suitable bearings in close proximity to and preferably above the respective operating shafts 22. Gears 44, 45, are loosely mounted on the shafts 43 and a clutch member 46 is keyed to the shaft 43 to be moved into and out of engagement with either of the gears 44, 45, to lock the latter to the shaft. A shifting member 47 is provided for shifting the clutch 46 and gears 48, 49, are secured to the shaft 22 and coöperate with the respective gears 44, 45. The gear 48 meshes directly with the gear 44 and the gear 49 meshes with an intermediate gear 50, which latter meshes with the gear 45 for controlling the direction of rotation of the number bearing member 42.

The carrying from one of the number bearing members 42 to the next adjacent number bearing member is effected by means of a one-toothed gear 51 (see also Fig. 1)

one of which is secured to each of the shafts 20 and this one-toothed gear is adapted to coöperate with a gear 52 on the shaft 22, which latter gear is adapted to be shifted longitudinally on the shaft 22 so that the gear 52 will be moved out of a position to be engaged by the one-toothed gear 51, by means of a rock shaft 53 to which pins 54 are secured, each of which pins engages a collar 55 on the respective gears 52 to shift the latter against the tension of the elastic member 56. This shaft 52 is adapted to be rocked by means of a cam 57 (see Figs. 1 and 6) which engages an anti-friction roller 58 on the shaft 53. The cam 57 is secured to the power shaft 20 which contains the mutilated gears for operating the number bearing member of the highest denomination, and this cam operates on the anti-friction roller 58 to rock the shaft 53 after the carrying operation has taken place.

The gears 52 are normally held in their inoperating positions by means of what might be termed carrying dogs 59 (see Fig. 1) one end of which is adapted to pass behind the end of the collar 55 on the respective gears 52 when the latter are shifted in the manner just described, against the tension of the elastic member 56, and an elastic member 60 is provided for causing the carrying dogs to assume this position. These dogs 59 are tripped by means of a cam 61 (see also Fig. 6) one of which is carried by each of the number bearing members 42 and are so positioned that they will actuate the respective dogs 59 when the number bearing members cross the zero point in either direction.

The numbers or characters on the number bearing members 42 are exposed through suitable openings 62 in the casing 63 (see Fig. 2) and in order to direct the attention of the operator to the proper series of numbers on the number bearing members, of which there are two series, the shiftable shield or indicator 64 is provided, the latter being provided with two series of apertures or openings 65, 66, therethrough and are so arranged that when the shield or indicator 64 is shifted in one direction, one of the series of openings will expose a character in one of the series of numbers on the number bearing members while the other series of openings in the shiftable shield or indicator will pass under a portion of the frame work, so that the shield or indicator will conceal the numbers in the other series on the number bearing members. The shield or indicator 64 is adapted to be automatically shifted in one direction or the other whenever the highest number bearing member 42 crosses the zero point in either direction and this is accomplished by means of the cam or projection 67 (see Fig. 1) which coöperates with the yielding dogs 68, 69, carried by the shield or indicator. All of the above described mechanism, however, forms no part of the present invention and is clearly described in detail in the application above referred to.

Owing to the mechanical construction and the relation of the numbers of the two series on the number bearing members 42 with respect to each other, the amount registered and exposed on the number bearing members will be incorrect to the extent of "one" (or one "cent", as it will hereinafter be designated for the sake of convenience,) when the shield or indicator is shifted from one of the series of numbers to the other, as this shifting movement takes place just as the number bearing member of the highest denomination crosses the zero point in either direction, and after the calculation has been completed. In order, therefore, to indicate a correct amount on the number bearing members, it is necessary to supply this additional "cent" and it is more particularly the object of the present invention to provide manually-controlled mechanism whereby this "cent" may be added at the proper time. It is also the object of the present invention to provide means for giving notice to the operator by exposing a sign to this effect, and which notice or sign will be concealed or "taken down" automatically when the "cent" has been added. Suitable efficient mechanism for accomplishing this result will now be described.

A supplemental shield or shutter 70 (reference being now had more particularly to Figs. 2, 7 and 8) is provided, which coöperates with the shield 64 and is mounted to move with the shield 64 and also independently with respect thereto. For this purpose guides 71 are provided which are secured to the shield 64 and project through apertures 72, 73, in the portion 63 of the frame work. The shield 64 is preferably arranged beneath the portion 63 of the frame work while the supplemental shield or shutter 70 is arranged on the opposite side of the portion 63 of the framework. The guides 71 project beyond the outer face of the frame work to receive the supplemental shield or shutter 70. Thus it will be seen that when the shield 64 is shifted in the manner already described, the supplemental shield or shutter will be correspondingly shifted, the opening 72, 73, in the portion of the frame work 63 being wide enough to permit this movement of the supplemental shield or shutter with the shield 64. The supplemental shield or shutter is provided with a slot or opening 74 and is adapted when the shutter or supplemental shield is shifted with respect to the shield 64 to expose or conceal a legend or notice 75 "Add 1¢" and which latter is preferably placed upon the portion 63 of the framework. The supplemental shield or shutter is provided along one edge with notches 76 and along the opposite edge with notches 77. Coöperating with the notches 76 is a fixed finger or projection 78 having a tapered extremity adapted to enter the notches 76. A similar fixed projection or finger 79 is arranged to coöperate with the notches 77 on the opposite edge of the supplemental shield or shutter 70, and these fingers or projections 78, 79, are spaced from each other a suitable distance so that they will not interfere with the proper operation of the shield or shutter 70. Arranged along another side of the supplemental shield or shutter 70 are notches 80 with which a yielding dog 81 coöperates and this yielding dog is preferably mounted upon a fixed or stationary portion of the machine and is provided with a tapered extremity 82 adapted to enter the notches 80. With this improved construction it will be apparent, and assuming that the supplemental shield or shutter is in the position with respect to the shield 64, as shown in Fig. 2, when the shield or shutter 64 is shifted to the right so as to move the series of openings 65 into register with the openings 62, and the series of openings 66 out of register with the openings 62, the supplemental shield or shutter 70 will be moved toward the right with the shield 64 inasmuch as it is connected to the latter for movement therewith. As they move toward the right, and inasmuch as the finger or projection 78 is stationary, it will be apparent that the wall of the notch into which the tapered extremity of the projection 78 projects, will ride over the projection, which will shift the supplemental shield or shutter laterally with respect to the shield 64 in a direction to move the opening 74 so as to expose the legend 75. As the supplemental shield or shutter is thus shifted laterally, the wall of the notch into which the extremity of the yielding dog 81 projects, will ride over the extremity of the dog and shift the latter against the tension of the elastic member 83. By the time the extremity of the projection 78 reaches the extremity of the tooth 84 formed between the notches 76, the extremity 82 of the dog 81 will assume a position with respect to the tooth 85 between the notches 80, that the elastic member 83 will act upon the dog 81 to force the latter into the next notch 80 and thereby carry the supplemental shield or shutter into a position which will expose the legend. In other words, the projection 78 acts as a means to start the shield 70 in a direction to expose the legend while the dog 81 serves as a means for carrying the supplemental shield or shutter into its proper position.

By the time the supplemental shield 70 has reached a position to expose the legend and has also reached the limit of its movement toward the right, one of the notches, the notch on the left, will assume a position to receive the projection 79. Assuming now that the parts are in the position just described, that is, with the projection 79 extending into the left-hand notch 77 and the extremity 82 of the dog 81 projecting into the foremost notch 80, it will be apparent that when the shield 64 is shifted toward the left, the operation will be reversed, that is, the projection 79 will act upon the supplemental shield or shutter 70 to start it in a direction to conceal or cover the legend 75, and after it has been started, and has reached the proper position with respect to the shield 64, the dog 81 will act in a similar manner to shift or carry the supplemental shield a sufficient distance to cover the legend. Assuming now that the supplemental shield or shutter 70 has assumed a position to expose the legend 75, it will notify the operator that in order to obtain an accurate statement as to the amounts on the number bearing members 42, one "cent" must be added. This "cent" may be added according to the present exemplification of the invention in the manner which will now be described.

Secured to the running shaft 24 and for rotation therewith is a star or toothed wheel 86 similar to the star or toothed wheel 25. A disk 87 similar to the disk 26 is loosely mounted on the shaft 24. A dog 88 similar to the dog 27 is carried by the disk 87 and coöperates with the star or toothed wheel 86, an elastic member 89 being provided which tends normally to move the dog into engagement with the star or toothed wheel 86. This dog 88 is provided with a shoulder 90 and another dog or pawl 91 is loosely mounted on a rock shaft 92 and coöperates with the dog 88 by engaging the shoulder 90 thereof to move the dog 88 out of engagement with the star or toothed wheel 86 against the tension of the elastic member 89 to release the disk 87. A key 93 is provided which preferably projects through the portion 63 of the casing and in a convenient position for the operator and which key is provided with a stem 94 for rocking the dog 91 about its point of pivotal support at the will of the operator. Thus it will be seen that when the key 93 is depressed or actuated, the dog 88 will be released and the disk 87 will be locked for rotation with the shaft 24. It is only necessary, therefore, in order to add the necessary "cent" to the number bearing members 42, to convey this motion of the shaft 24 to the number bearing members and inasmuch as it is necessary to impart rotation to the shaft 29, to accomplish this result, it will be apparent that the gear 28 must also be locked for rotation with the shaft 24. For this purpose there is provided a cam 95 which is secured to the disk 87 for rotation therewith and this cam 95 is adapted to engage an arm 96 on the rock shaft 92 so that when the cam 95 is rotated the shaft 92 will be rocked. After the disk 87 is locked to the shaft 24 in the manner just described, the cam will act upon the arm 96 to rock the shaft 92 and thereby move an arm or projection 97 on the shaft 92 into engagement with a projection 98 on the dog 39 so as to rock the latter about its point of pivotal support, which movement will release the dog 27 and the disk 26 and gear 28 will then be locked to the shaft 24 in the manner already described. As the gear 28 and the disk 87 are adapted to make one complete revolution and then be released from the shaft 24, it will be apparent that after the addition of this "cent" the mechanism will be thrown out of operation, provided that the key 93 has been released. When thus released an elastic member 99 will return the key to its normal position and the dog 91 to a position in which it will engage the shoulder 90 of the dog 88 to move the latter out of engagement with the star or toothed wheel 86. A yielding dog 100 is provided for locking the disk 87 and cam 95 against overthrow.

From the above description it is thought that the operation will now be clearly understood, and it will thus be seen that after the shield 64 has been shifted and the supplemental shield or shutter 70 has also been shifted with respect to the shield 64 to expose the legend 75, and the operator has depressed the key 93, the necessary "cent" will be added to the amount exposed on the number bearing members 42. With the mechanism thus far described, it will also be apparent that the legend 75 will still be exposed and would notify the operator that one "cent" must still be added even after the "cent" has already been added, and this would indicate an inaccurate result. This would be true unless the shield 64 is again shifted to the left. The resultant which is exposed on the number bearing members might be such that the shield or indicator 64 will not be shifted to the left and unless this legend is "taken down" or concealed, mistakes will be liable to occur. It is therefore necessary in order to avoid mistakes, to provide means for "taking down" or concealing this legend after the "cent" has been added and before the shield 64 is again shifted to another position. Suitable mechanism for accomplishing this result will now be described.

Pivotally mounted upon any fixed portion of the machine, preferably the portion 63, is a bell crank lever 102, one arm 103 of which is adapted to engage an extended surface 104 on the edge of the supplemental shield or shutter 70 so as to move or shift the shield or shutter into a position to cover the legend 75. An elastic member 104 is provided which is connected with the other arm 105 of the bell crank lever and to a suitable fixed support which tends normally to hold the arm 103 of the bell crank lever out of operating position. If therefore the bell crank lever 102 is rocked against the tension of the elastic member 104, the supplemental shield or shutter 70 will be shifted into the position shown in Fig. 2, if the legend 75 is exposed before the bell crank lever is rocked. This rocking movement may be imparted to the bell crank lever by means of an arm 106 which is secured to the rock shaft 92 for movement therewith and the bell crank lever is so arranged that the arm 105 will stand normally within the path of movement of the arm 106. Thus it will be seen that the actuation of the key 93 will not only cause the necessary "cent" to be added but will also shift the supplemental shield or shutter 70 to conceal the legend 75 after the "cent" has been added, in the event that the shield 64 is not shifted. A spring-controlled dog 107 which coöperates with notches 108 is provided for holding the shield 64 in its adjusted positions.

Referring now more particularly to Figs. 9 to 14, the mechanism therein shown for indicating when it is necessary to add the extra "cent" comprises a rotary indicator 109 which is mounted upon a suitable fixed support to rotate about an axis 110. This indicator is preferably in the form of a disk, the face of which may be divided into spaces 111 and arranged in the alternate spaces is the legend 112 "Add 1¢", and the remaining spaces are left blank. The portion 63 of the frame work is provided with an aperture 113 through which the legend 112 may be read. By providing each alternate space with a legend so that the intervening spaces will be blank, it will be apparent that in the event that a space containing a legend is positioned so that the latter will be visible through the opening 113, the operator will understand that "1¢" must be added. After the "cent" has been added, the indicator 109 will be given one step of rotation in a manner to be hereinafter set forth, which will cause a blank space to appear under the opening 113. The manner of rotating the indicator will now be described.

Connected with the indicator is a ratchet wheel 114 and upon a fixed support is a reciprocating member 115 provided in one edge with notches 116. Supported by this member 115 is a yielding dog or pawl 117, which latter coöperates with the ratchet 114. The shield 64 is provided with an arm 118, the extremity 119 of which coöperates with the member 115 and is adapted to enter the notches 116. Thus it will be seen that when the shield 64 is shifted in the manner already set forth, the extremity 119 of the arm 118 will ride out of one of the notches 116 and into a position to enter the other of the notches. During this movement of the arm 118, the member 115 will be shifted in one direction against the tension of the elastic member 120, which will cause the dog 117 to move the ratchet 114 one step of rotation and as this ratchet 114 is rotated, the indicator 109 to which it is connected will also be rotated a corresponding degree of rotation. This rotation of the indicator 109 will be effected when the shield 64 is moved in either direction. A reciprocating member 121, similar to the member 115, is provided on the opposite side of the ratchet 114 and supported by this member 121 is a yielding dog 122 similar to the dog 117 and which also coöperates with the ratchet 114 and is arranged to engage the teeth of the ratchet on the side opposite to the side on which the dog 117 engages the teeth. An elastic member 123 is provided which tends normally to move the member 121 in a direction to position the dog 122 to be shifted by the arm 103 of the bell crank lever 102 when the latter is rocked in the manner as already set forth.

In order to lock the key 93 against actuation after the "cent" has been added, and referring now more particularly to Figs. 2, 5 and 8, the supplemental shield or indicator 70 is provided with an extension 124. The stem of the key 93 is provided with a projection 125 which latter is so arranged that when the supplemental shield or indicator is shifted to the position shown in Fig. 2, that is, into a position where the legend 75 will be concealed, the extension 124 will pass under the projection 125 and thereby lock the key 93 against actuation. This locking of the key 93 is accomplished by the rotary indicator 109 in a manner which will now be described. The indicator 109 is provided with a plurality of radially projecting lugs or fingers 126 extending from the periphery thereof and these lugs 126 are preferably arranged adjacent the blank spaces 111 and are adapted to act upon an arm or lever 127 which latter is pivoted intermediate its ends as at 128 to a fixed support. A link or slide 129 is pivotally connected by one extremity as at 130 to one end of the arm or lever 127 and this link or slide is adapted to be projected beneath the pin or projection 125 on the stem of the key 93 against the tension of an elastic member 131. The other end of the arm or lever 127 is arranged in such a position that the radially projecting ears or fingers 126 will successively engage such end and rock the arm or lever about its pivot 128 so as to move the slide or link 129 into the position just described to lock the key. This operation will be effected just as a blank space 111 on the indicator 109 appears beneath the opening 113. When the shield 64 is shifted in the manner already described, and assuming the parts to be in the position just described, the arm 118 will cause the dog 117 to move the indicator 109 about its pivot so as to expose the legend 112. During this movement of the indicator the ear or projection 126 will be moved away from the extremity of the arm or lever 127 and the elastic member 131 will shift the slide or link 129 to unlock the key 93. This movement of the arm or lever 127 will cause its free extremity to be moved into the path of movement of the next advancing ear or projection 126. The yielding dog 144ᵃ is provided which coöperates with a notched wheel 114ᵇ, which latter is secured for rotation with the indicator 109, to lock the latter against overthrow.

What is claimed as new is—

1. In a calculating machine, the combination of a totalizer embodying number bearing members, means for actuating said members to register an amount thereon, means for adding an additional digit thereto after the said registering operation, and means for indicating when such additional digit should be added.

2. In a calculating machine, the combination of a totalizer embodying number bearing members, means for actuating said members to register an amount thereon, manually-controlled means for adding an additional digit thereto after the said registering operation, and means for indicating when such additional digit should be added.

3. In a calculating machine, the combination of a totalizer embodying number bearing members, means for actuating said members to register an amount thereon, means for adding an additional digit thereto, an indicator, means for rendering said indicator active to designate when such additional digit should be added, and means for rendering the indicator inactive after such additional digit has been added.

4. In a calculating machine, the combination of a totalizer embodying number bearing members, means for actuating said members to register an amount thereon, manually-controlled means for adding an additional digit thereto, an indicator, means for rendering said indicator active to designate when such additional digit should be added, and means for rendering the indicator inactive after such additional digit has been added.

5. In a calculating machine, the combination of a totalizer embodying number bearing members, means for actuating said members to register an amount thereon, means for adding an additional digit thereto, an indicator, means for rendering said indicator active to designate when such additional digit should be added, and means controlled by the second recited means for rendering the indicator inactive after such additional digit has been added.

6. In a calculating machine, the combination of a totalizer embodying number bearing members, means for actuating said members to register an amount thereon, manually controlled means for adding an additional digit thereto, an indicator, means for rendering said indicator active to designate when such additional digit should be added and mechanism controlled by the said manually controlled means for rendering the indicator inactive after such additional digit has been added.

7. In a calculating machine, the combination of a totalizer embodying number bearing members, means for actuating said members to register an amount thereon, means for adding an additional digit thereto, an indicator, means for automatically rendering the indicator active to designate when such additional digit should be added, and means for automatically rendering the indicator inactive after such digit has been added.

8. In a calculating machine, the combination of a totalizer embodying number bearing members, means for actuating said members to register an amount thereon, means for adding an additional digit thereto, an indicator, means for automatically rendering the indicator active to designate when such additional digit should be added, means for automatically rendering the indicator inactive after such digit has been added, and additional means for also rendering the indicator inactive.

9. In a calculating machine, the combination of a totalizer embodying number bearing members, means for actuating said members to register an amount thereon, manually controlled means for adding an additional digit thereto, an indicator, means for automatically rendering the indicator active to designate when such additional digit should be added, means for automatically rendering the indicator inactive after such digit has been added, and mechanism controlled by said manually controlled means for also rendering the indicator inactive.

10. In a calculating machine, the combination of a totalizer embodying number bearing members, means for actuating said members to register an amount thereon, manually controlled means for adding an additional digit thereto, after the registering operation, means for indicating when such additional digit should be added, and means for locking the said manually controlled means against actuation after the said additional digit has been added.

11. In a calculating machine, the combination of a totalizer embodying number bearing members, means for actuating said members to register an amount thereon, manually controlled means for adding an additional digit thereto, after the registering operation, means for indicating when such additional digit should be added, and means controlled by the said indicator for locking the said manually controlled means against actuation after the said additional digit has been added.

12. In a calculating machine, the combination of a totalizer embodying number bearing members, means for actuating the members to register an amount thereon, manually-controlled means for adding an additional digit thereto after the registering operation, an indicator for designating when such digit should be added, means for rendering said indicator active, means for rendering the indicator inactive, and means for locking the said manually controlled means against operation after such digit has been added.

13. In a calculating machine, the combination of a totalizer embodying number bearing members, means for actuating the members to register an amount thereon, manually controlled means for adding an additional digit thereto after the registering operation, an indicator for designating when such digit should be added, means for rendering said indicator active, mechanism controlled by the said manually-controlled means for rendering the indicator inactive, and means for locking the manually-controlled means against actuation after the addition of such additional digit.

14. In a calculating machine, the combination of a totalizer embodying number bearing members, means for actuating the members to register an amount thereon, manually-controlled means for adding an additional digit thereto after the registering operation, an indicator for designating when such digit should be added, means for rendering said indicator active, means for rendering the indicator inactive, and means controlled by the said indicator for locking the said manually controlled means against operation after such digit has been added.

15. In a calculating machine, the combination of a totalizer embodying number bearing members, means for actuating the members to register an amount thereon, manually-controlled means for adding an additional digit thereto after the registering operation, an indicator for designating when such digit should be added, means for rendering said indicator active, mechanism controlled by the said manually-controlled means for rendering the indicator inactive, and means controlled by the indicator for locking the manually-controlled means against actuation after the addition of such additional digit.

16. In a calculating machine, the combination of a totalizer embodying number bearing members, means for actuating the members to register an amount thereon, manually-controlled means for adding an additional digit thereto after the registering operation, an indicator for designating when such digit should be added, means for rendering such indicator active, means for rendering the indicator inactive, and means controlled by the indicator for respectively unlocking and locking the manually-controlled means against actuation when the indicator is rendered active and inactive.

17. In a calculating machine, the combination of a totalizer embodying number bearing members, means for actuating the members to register an amount thereon, manually-controlled means for adding an additional digit thereto after the registering operation, an indicator for designating when such digit should be added, means for rendering such indicator active, means controlled by the said manually-controlled means for rendering the indicator inactive, and means controlled by the indicator for respectively unlocking and locking the manually controlled means against actuation when the indicator is rendered active and inactive.

18. In a calculating machine, the combination of a totalizer embodying number bearing members, means for actuating the members to register an amount thereon, manually-controlled means for adding an additional digit thereto after the registering operation, an indicator for designating when such digit should be added, means for rendering such indicator active, means for rendering the indicator inactive, means controlled by the indicator for respectively unlocking and locking the manually controlled means against actuation when the indicator is rendered active and inactive, and additional means for also rendering the indicator inactive.

19. In a calculating machine, the combination of a totalizer embodying number bearing members, means for actuating the members to register an amount thereon, manually-controlled means for adding an additional digit thereto after the registering operation, an indicator for designating when such digit should be added, means for rendering such indicator active, means for rendering the indicator inactive, means controlled by the indicator for respectively unlocking and locking the manually controlled means against actuation when the indicator is rendered active and inactive, and means controlled by the said manually controlled means for also rendering the indicator inactive.

20. In a calculating machine, the combination of a totalizer embodying a plurality of number bearing members, each having two sets of figures thereon, operating mechanism for the members, an indicator movable from one to the other of the sets, means for thus moving the indicator when the number bearing member crosses the zero point in either direction, means for adding a digit to the number bearing member of the lowest order, and means for indicating when such additional digit should be added.

21. In a calculating machine, the combination of a totalizer embodying a plurality of number bearing members, each having two sets of figures thereon, operating mechanism for the members, an indicator movable from one to the other of the sets, means for thus moving the indicator when the number bearing member crosses the zero point in either direction, manually controlled means for adding a digit to the number bearing member of the lowest order, and means for indicating when such additional digit should be added.

22. In a calculating machine, the combination of a totalizer embodying a plurality of number bearing members, each having two sets of figures thereon, operating mechanism for the members, an indicator movable from one to the other of the sets, means for thus moving the indicator when the number bearing member crosses the zero point in either direction, means for adding a digit to the number bearing member of the lowest order after the completion of calculation, and means controlled by the indicator for indicating when such additional digit should be added.

23. In a calculating machine, the combination of a totalizer embodying a plurality of number bearing members each having two sets of figures thereon, operating mechanism for the members, an indicator movable from one to the other of the sets, means for thus moving the indicator when the number bearing member crosses the zero point in either direction, manually-controlled means for adding a digit to the number bearing member of the lowest order after the completion of calculation, and means controlled by the indicator for indicating when such additional digit should be added.

24. In a calculating machine, the combination of a totalizer embodying a plurality of number bearing members, each having two sets of figures thereon, operating mechanism for the members, an indicator movable from one to the other of the sets, means for thus moving the indicator when the number bearing member crosses the zero point in either direction, and means for adding a digit to the number bearing member of the lowest order after the completion of calculation, a second indicator for indicating when such additional digit should be added, and means whereby the movement of the first recited indicator will actuate the second recited indicator.

25. In a calculating machine, the combination of a totalizer embodying a plurality of number bearing members, each having two sets of figures thereon, operating mechanism for the members, an indicator movable from one to the other of the sets, means for thus moving the indicator when the number bearing member crosses the zero point in either direction, means for adding a digit to the number bearing member of the lowest order after the completion of calculation, a second indicator for indicating when such additional digit should be added, and means whereby the movement of the first recited indicator in either direction will actuate the second recited indicator.

26. In a calculating machine, the combination of a totalizer embodying a plurality of number bearing members, each having two sets of figures thereon, operating mechanism for the members, an indicator movable from one to the other of the sets, means for thus moving the indicator when the number bearing member crosses the zero point in either direction, manually-controlled means for adding a digit to the number bearing member of the lowest order after the completion of calculation, a second indicator for indicating when such additional digit should be added, and means whereby the movement of the first recited indicator will actuate the second recited indicator.

27. In a calculating machine, the combination of a totalizer embodying a plurality of number bearing members, each having two sets of figures thereon, operating mechanism for the numbers, an indicator movable from one to the other of the sets, means for thus moving the indicator when the number bearing member crosses the zero point in either direction, manually-controlled means for adding a digit to the number bearing member of the lowest order after the completion of calculation, a second indicator for indicating when such additional digit should be added, and means whereby the movement of the first recited indicator in either direction will actuate the second recited indicator.

28. In a calculating machine, the combination of a totalizer embodying a plurality of number bearing members, each having two sets of figures thereon, operating mechanism for the members, an indicator movable from one to the other of the sets, means for thus moving the indicator when the number bearing member crosses the zero point in either direction, manually-controlled means for adding a digit to the number bearing member of the lowest order, means for indicating when such additional digit should be added, and means for automatically rendering the second recited indicator active and inactive.

29. In a calculating machine, the combination of a totalizer embodying a plurality of number bearing members, each having two sets of figures thereon, operating mechanism for the members, an indicator movable from one to the other of the sets, means for thus moving the indicator when the number bearing member crosses the zero point in either direction, manually controlled means for adding a digit to the number bearing member of the lowest order, means for indicating when such additional digit should be added, and means whereby the movement of the first recited indicator in either direction will render the second recited indicator active or inactive.

30. In a calculating machine, the combination of a totalizer embodying a plurality of number bearing members, each having two sets of figures thereon, operating mechanism for the members, an indicator movable from one to the other of the sets, means for thus moving the indicator when the number bearing member crosses the zero point in either direction, manually controlled means for adding a digit to the number bearing member of the lowest order, means for indicating when such additional digit should be added, means whereby the movement of the first recited indicator will render the second recited indicator active, and means whereby the second recited indicator may be rendered inactive independently with respect to the movement of the first recited indicator.

31. In a calculating machine, the combination of a totalizer embodying a plurality of number bearing members, each having two sets of figures thereon, operating mechanism for the members, an indicator movable from one to the other of the sets, means for thus moving the indicator when the number bearing member crosses the zero point in either direction, manually-controlled means for adding a digit to the number bearing member of the lowest order, means for indicating when such additional digit should be added, means whereby the movement of the first recited indicator will render the second recited indicator active, and means actuated by the said manually controlled means whereby the second recited indicator may be rendered inactive independently with respect to the movement of the first recited indicator.

32. In a calculating machine, the combination of a totalizer embodying a plurality of number bearing members, each having two sets of figures thereon, operating mechanism for the members, an indicator movable from one to the other of the sets, means for thus moving the indicator when the number bearing member crosses the zero point in either direction, manually-controlled means for adding a digit to the number bearing member of the lowest order, means for indicating when such additional digit should be added, means for automatically rendering the second recited indicator active and inactive, and additional means for rendering the second recited indicator inactive independently with respect to the movement of the first recited indicator.

33. In a calculating machine, the combination of a totalizer embodying a plurality of number bearing members, each having two sets of figures thereon, operating mechanism for the members, an indicator movable from one to the other of the sets, means for thus moving the indicator when the number bearing member crosses the zero point in either direction, manually-controlled means for adding a digit to the number bearing member of the lowest order, means for indicating when such additional digit should be added, means for automatically rendering the second recited indicator active and inactive, and means operatively related to the said manually controlled means for rendering the second recited indicator inactive.

34. In a calculating machine, the combination of a totalizer embodying a plurality of number bearing members, each having two sets of figures thereon, operating mechanism for the members, an indicator movable from one to the other of the sets, means for thus moving the indicator when the number bearing member crosses the zero point in either direction, manually controlled means for adding an additional digit to the number bearing member of the lowest order, means for indicating when such digit should be added, and means for locking the manually controlled means against actuation after the additional digit has been added.

35. In a calculating machine, the combination of a totalizer embodying a plurality of number bearing members each having two sets of figures thereon, operating mechanism for the members, an indicator movable from one to the other of the sets, means for thus moving the indicator when the number bearing member crosses the zero point in either direction, manually-controlled means for adding an additional digit to the number bearing member of the lowest order, means for indicating when such digit should be added, and means controlled by the last recited means for locking the manually controlled means against actuation after the additional digit has been added.

36. In a calculating machine, the combination of a totalizer embodying a plurality of number bearing members, each having two sets of figures thereon, operating mechanism for the members, an indicator movable from one to the other of the sets, means for thus moving the indicator when the number bearing member crosses the zero point in either direction, manually-controlled means for adding an additional digit to the number bearing member of the lowest order, means for indicating when such digit should be added, and means controlled by the last recited means for locking the said manually-controlled means against actuation after the additional digit has been added and for unlocking the same when the digit is to be added.

37. In an algebraic calculating machine, the combination of means for registering negative and positive resultants embodying means whereby a deficit in the resultant results when the registering means passes through zero, and automatic means responsive to signify the resulting deficit.

38. In an algebraic calculating machine, the combination of means for registering negative and positive results embodying means whereby a deficit in the resultant results when the registering means passes through zero, and signaling means for indicating the existence of the deficit operatively connected with said registering means.

39. In an algebraic calculating machine, the combination with mechanism for registering negative and positive resultants embodying means whereby a deficit in the resultant results when the registering parts pass through zero, signaling mechanism for displaying the resulting deficit, and means for removing the signal when the deficit is rectified.

40. In an algebraic calculating machine, the combination of means for registering negative and positive resultants embodying means whereby a deficit in the resultant results when the zero point is passed, means for signifying when the deficit exists, and means for signifying when the deficit has been rectified.

41. In an algebraic calculating machine, the combination of means for registering negative and positive resultants embodying means whereby a deficit in the resultant results when the operation passes through zero, means for adding the deficit, and means for locking said deficit adding means against operation save when the deficit exists.

In testimony whereof I have signed my name to this specification, in the presence of two subscribing witnesses, on this 19th day of January A. D. 1911.

FRANCIS A. HOPKINS.

Witnesses:
J. H. JOCHUM, Jr.
NINA J. HALSNE.